June 4, 1963 E. A. TESCH, JR 3,092,059

ASSEMBLY APPARATUS

Filed Jan. 20, 1958 7 Sheets-Sheet 1

INVENTOR.
Ernest A. Tesch, Jr.
BY Mueller & Aichele
Att'ys.

June 4, 1963 E. A. TESCH, JR 3,092,059

ASSEMBLY APPARATUS

Filed Jan. 20, 1958 7 Sheets-Sheet 2

INVENTOR.
Ernest A. Tesch, Jr.,
BY Mueller & Aichele
Att'ys

June 4, 1963 E. A. TESCH, JR 3,092,059

ASSEMBLY APPARATUS

Filed Jan. 20, 1958 7 Sheets-Sheet 3

INVENTOR.
Ernest A. Tesch, Jr.,
BY Mueller & Aichele
Att'ys.

June 4, 1963 E. A. TESCH, JR 3,092,059

ASSEMBLY APPARATUS

Filed Jan. 20, 1958 7 Sheets-Sheet 4

INVENTOR.
Ernest A. Tesch, Jr.,
BY Mueller & Aichele
Attys.

INVENTOR.
Ernest A. Tesch, Jr.
BY Mueller & Aichele
Att'y's.

ASSEMBLY APPARATUS

Filed Jan. 20, 1958 7 Sheets-Sheet 6

INVENTOR.
Ernest A. Tesch, Jr,
BY Mueller & Aichele
Att'ys.

INVENTOR.
Ernest A. Tesch, Jr.,
BY Mueller & Aichele
Att'ys.

United States Patent Office 3,092,059

Patented June 4, 1963

3,092,059

ASSEMBLY APPARATUS

Ernest A. Tesch, Jr., Chicago, Ill., assignor to Motorola, Inc., Chicago, Ill., a corporation of Illinois Filed Jan. 20, 1958, Ser. No. 710,057
9 Claims. (Cl. 113—126)

This invention relates to assembly apparatus and more particularly to apparatus for assembling an electronic chassis or the like which chassis includes electronic components supported on a flat panel. The invention especially relates to soldering apparatus for producing a scum-free solder hump of controlled dimensions and configuration and to a method of soldering which utilizes such a hump.

The use of printed and plated circuits in manufacture of electronic equipment has become widespread in recent years. Such circuits generally consist of electrical conductors formed on one or both sides of a thin, flat, molded plastic panel. These panels are equipped with interconnected metallized eyelets or equivalent means extending through them for receiving the terminals of various electronic components supported on the panel. The components are secured to the panel by soldering the terminals to the eyelets. In order that such chassis be manufactured as efficiently and economically as possible, it is desirable that insertion of the components into the panel and application of solder thereto be carried out automatically or semi-automatically. In modern manufacturing techniques, it is desirable that articles being assembled be moved continuously along a straight line for the performing of the various assembly operations and that the assembly equipment to accomplish this be relatively compact and not occupy excessive floor space. In the manufacture of electronic equipment such as radios and television receivers, a number of different chassis of different sizes and containing different numbers and combinations of components are employed. It is therefore desirable that assembly equipment for such products be flexible and easily adapted to the handling and production of chassis of a variety of sizes and component combinations.

A particular problem in the application of so-called "straight-line" assembly techniques to the manufacture of printed circuit chassis has been the application of solder. The application of solder to each individual connection of a chassis by means of a soldering iron is obviously time consuming and uneconomical. In the past, solder has been applied by dipping one surface of the circuit panel into a molten solder bath. This method has numerous disadvantages such as the difficulty of providing a simple and compact mechanism for affecting this application on a mass production basis. In addition, there is a problem of scum formation on the surface of the molten solder. This scum must be eliminated in order to provide satisfactory solder connections. Another difficulty is that the heat of the molten solder will sometimes damage the plastic panel employed as the insulating base during the dipping operation unless expensive heat resistant substances are employed.

Recently solder has been applied to printed circuit panels by apparatus which raises a moving, scum-free, hump-like mass of molten solder in a container and wipes the surfaces of the panels across the top of the hump. Such apparatus is described in the copending application of Charles Hepner, Serial No. 561,427, filed June 26, 1956, assigned to the assignee of this application. This method is superior to dip soldering in that it prevents scum formation by providing a continuously moving clean solder surface and by permitting simple straight line motion of the panels being soldered. The solder hump has been produced by a submerged rotating paddle wheel which impels solder in an upward direction. Although this apparatus represents a substantial advance over dip soldering machines and the submerged paddle wheel produces a solder hump which is clean and scum-free, the level reached by the hump slowly but continuously drops as the supply of solder within the container becomes depleted by being deposited on successive panels drawn across the hump. This is because the paddle wheel impeller forms a hump that reaches a particular height above the normal solder level in the container for a given speed of rotation. As the solder becomes depleted, the normal level begins to drop and with it the level reached by the solder hump. This depletion occurs very slowly and gradually, nevertheless, in large scale operations at least, fairly frequent replenishing of solder in the container may be required in order that the desired solder hump level be maintained. Thus, the operator of the soldering apparatus must keep a careful check on the solder level in the container in order that circuit panels, which are continuously passed over the solder hump raised in the solder body, will be reached by molten solder or automatic solder replenishing means must be provided. If the level of the solder hump drops to a point where contact is no longer made, circuit panel assemblies will pass through the soldering apparatus without connection having been established between the component and the circuit panel.

Since it is desired to pass successive flat circuit panel assemblies to be soldered over the solder hump and to obtain uniform soldering for each panel, it is desirable that the level of the top of the solder hump be uniform so that solder is applied uniformly across the width of the panels. Since the hump has the form of an upwardly flowing molten mass, any variation at the rate of upward flow with respect to time would tend to cause variation in the height of the hump and any variation in the rate of flow with respect to position as measured across the hump would tend to produce a mass of non-uniform and varying contour.

In addition to the problems previously mentioned, soldering so-called printed circuit panels must be done without injuring the insulating board as well as the complete circuit on the board and the components to be soldered thereto by the heat of the solder. At the same time the assembly or workpiece to be soldered must be heated enough for ready flow and adhesion of the solder to the places to be soldered. This has been a serious problem in the art.

It is an object of the present invention to provide apparatus for the effective and economical application of solder to the junctions of printed circuit assemblies while such assemblies are being moved along a straight line in uniplanar relation to one another.

It is another object of this invention to provide apparatus for raising a clean, scum-free solder hump of uniform and controlled contour.

It is another object of the invention to provide soldering apparatus in which the top of a solder hump is maintained at a constant level during depletion of the solder supply by successive application to workpieces passed across the hump.

It is yet another object of the invention to provide apparatus for raising a solder hump having a substantially flat, horizontal top so that solder is applied uniformly to flat surfaces passed across it.

Another object is to provide apparatus for soldering so that the time the solder and the heat from the solder are applied to the workpiece is accurately controlled.

It is still another object of the invention to provide means for moving articles such as printed circuit panels successively to a series of component insertion stations, locating them accurately at such stations to permit the automatic insertion of components into holes in the panel and permitting them to dwell at such stations for a predetermined length of time to permit such insertion to be accomplished.

It is a further object of the invention to provide means for the simple and economical application of soldering flux to the leads of components inserted in the holes in printed circuit panels to facilitate their subsequent soldering to the bores of such holes.

It is yet a further object of the invention to provide assembly equipment for printed circuit chassis wherein printed circuit panels are moved in intermittent motion to a series of component inserting stations and then moved continuously across fluxing and soldering stations to complete their assembly.

A feature of my invention is the provision of a "straight-line" type of workpiece conveying and soldering apparatus which automatically handles a plurality of workpieces having a heat-sensitive assembly, and applies a mass of continuously flowing molten solder moved by a positive displacement pump to the assembly for a predetermined and controllable time period and over a predetermined but variable area of the workpiece.

Another feature of the invention is the provision of a constantly circulating mass of solder lifted and propelled by horizontally mounted rotating means engaging a solder body which mass is confined above the rotating means so that it forms a hump of predetermined width and a controlled height. Workpieces such as printed circuit panels are moved across and in contact with the top of the hump for the application of solder thereto. By employing a positive displacement gear pump including a pair of intermeshing cylindrical gears the solder mass is lifted by positive displacement so that the level reached by the top of the hump is controlled by the speed of rotation of the gears and can be maintained at a constant level while the total quantity of solder is being depleted by application to successive panels. Since the solder is drawn from the interior of the solder body it is clean and scum-free thus providing effective solder connections.

Another feature of the invention is the provision of a pair of spaced-apart adjustable housing members which confine the aforesaid gears and the solder mass raised by the rotation of the gears. The gears rotate within the housing members which cooperate with the gear teeth to confine solder trapped between adjacent teeth of each gear and permit the solder to be lifted by rotation of the gears. These housing members are dimensioned and of such configuration that when they are movably mounted in the pump mechanism they may be adjustably positioned so that there is an opening between them at the top and at the bottom. The opening at the top exposes the top of the solder hump in an area of controlled size. That size is governed by the desired time that the solder mass or hump is to contact the workpieces moved across it. The workpieces move across the solder hump in the same direction along which the housing members are spaced from one another, so that the spacing between them controls the length of the exposed solder hump top.

Still another feature of the invention is the provision of a baffle vertically spaced from a positive displacement pump in a solder container for deflecting the flow of solder impelled upwardly by the pump. The baffling action tends to reduce turbulence and uniformly distributes the solder flow with the result that a solder hump is formed whose top is maintained at a constant level and has a uniform contour. This, in turn, permits uniform application of solder over flat workpieces.

Another feature of the invention is the provision of a positive displacement gear pump positioned within a container for molten solder which pump includes a pair of cylindrical gears each cut with helical teeth advancing in one direction along half of its axial dimension and in the opposite direction along the other half. The teeth of the gears are thus formed in a herringbone pattern. Solder in the interior of the solder body in the container is trapped in spaces between adjacent gear teeth and confined there by housing members surrounding the gears. The solder is lifted by rotation of the gears and is discharged by being displaced by meshing of the teeth. By providing the particular helical gear teeth pattern specified, solder is discharged progressively along the entire length of the gear cylinders thus producing overlapping solder discharge pulses tending to provide a uniform solder flow and a solder hump of uniform controlled height. The soldering area of the hump is controlled by a combination of adjustable guide plates at the top of the pump and adjustable housing members which to some extent encircle the gears.

Still another feature of the invention is the use of materials non-alloying to solder to form a wall of the solder container, the drive shaft extending through the wall for actuating the aforesaid displacement pump and the bushing within which the shaft rotates. A high temperature lubricant such as a silicone grease is used to fill the space between the shaft and the bushing. The combination of the non-alloying materials and the high temperature lubricant operates to prevent leakage of solder around the shaft and permits use of a simplified drive for the pump wherein a rotating shaft enters the solder container below the level of the solder body held therein.

Another feature of the invention is the provision of assembly apparatus including a component insertion section comprising a pair of parallel tracks engaging the edges of printed circuit panels and along which the panels are moved intermittently by means of a series of reciprocating fingers from one insertion station to another and a soldering section which includes a conveyor system for moving the panels into which components have been inserted across a fluxing station and thence across the top of a clean, scum-free solder hump for the affixing of the components to the panels.

Still another feature of the invention is the provision of a reciprocating transfer bar moving horizontally along the component insertion section of the assembly apparatus and carrying vertically extending fingers which engage the edges of panels held between the parallel tracks making up the insertion section. The finger is pivotally mounted so that it engages the edges of the panels on the forward stroke and moves them from one insertion station to another and then tips over when it engages a rearwardly located panel on the backward stroke of the transfer bar and passes under the panel in returning to its original position.

A further feature of the invention is the provision of a series of retractable locators in one track of the aforementioned component insertion section for engaging notches formed in the edges of the panels and cooperating with spring padding in the opposite track to insure accurate location of the panels at the insertion stations. This permits the use of automatic machinery for insertion of components into holes that are formed in the panels.

Still a further feature of the invention is the provision of a horizontally moving chain with grooved links for picking up panels at their edges from the last component insertion station of the insertion section and moving them along the soldering section at a uniform rate past fluxing and soldering stations.

Yet a further feature of the invention is the provision of a fluxing nozzle formed by a pair of spaced-apart plates extending vertically with the upper face of one of the plates forming a slight angle declining from the horizontal. This permits the flux to be expressed from the nozzle as an upstanding roll across which circuit panel assemblies are moved with the leads of inserted components engaging the flux roll and picking up a coating of flux therefrom.

In the accompanying drawings:

FIGS. 1 and 1*a* are plan views of the assembly apparatus showing drive, component insertion and soldering sections. The solder apparatus shown substantially centrally of FIG. 1*a* is in a somewhat diagrammatic condition inasmuch as adjustable elements in the solder container are omitted for clarity of illustration in the small size of the drawing.

FIGS. 2 and 2*a* are views in side elevation of the assembly apparatus;

FIG. 2*b* is a schematic diagram of the timing circuit used in controlling motion of the panels through the component insertion station;

The apparatus of the present invention includes a component insertion section wherein circuit panels or similar workpieces are moved successively to insertion stations and accurately located there for the insertion of components into holes formed in the panels for that purpose. The assembly apparatus also includes a soldering device having an open top container for molten solder and a positive displacement solder pump engaging the molten solder. Solder is applied by passing the panels across the top of a scum-free solder hump formed by positive displacement action of a pair of intermeshing cylindrical gears which gears have helically formed solder lifting teeth. A pair of housing members extend longitudinally around the gears confining solder trapped in the spaces between adjacent teeth of each gear. Solder flows between the opening formed between the housing members at their tops and presents a clean, flat solder surface with which the workpieces are contacted. A baffle member is provided above the gears to reduce turbulence of solder flow. The configuration of the solder pump in conjunction with the housing means and the baffle permits the production of a solder hump of uniform and controllable height and contour thus permitting uniform application of solder across the entire area of the panels. Because the solder hump is raised by positive displacement action, its height is effectively independent of the amount of solder in the solder container and the height can be maintained at a constant level by uniform rotation of the gears while solder is being depleted from the container. This is of substantial practical advantage since the total quantity of solder in the container need not be controlled with great care so long as there is sufficient solder to be engaged and lifted by the gear teeth.

In accordance with this invention, a clean solder hump of controlled dimension and contour and having a flat exposed top portion is raised by positive displacement. This permits flat workpieces moved through a horizontal plane to be brought into planar contact with the hump by passing at least the lower surfaces of the workpieces across its upper surface. Since upper surface of the hump is maintained at a predetermined level parallel to the lower surface of the workpieces, uniform solder contact over the entire workpiece surface is effected.

Figures 1, 2, 2B:
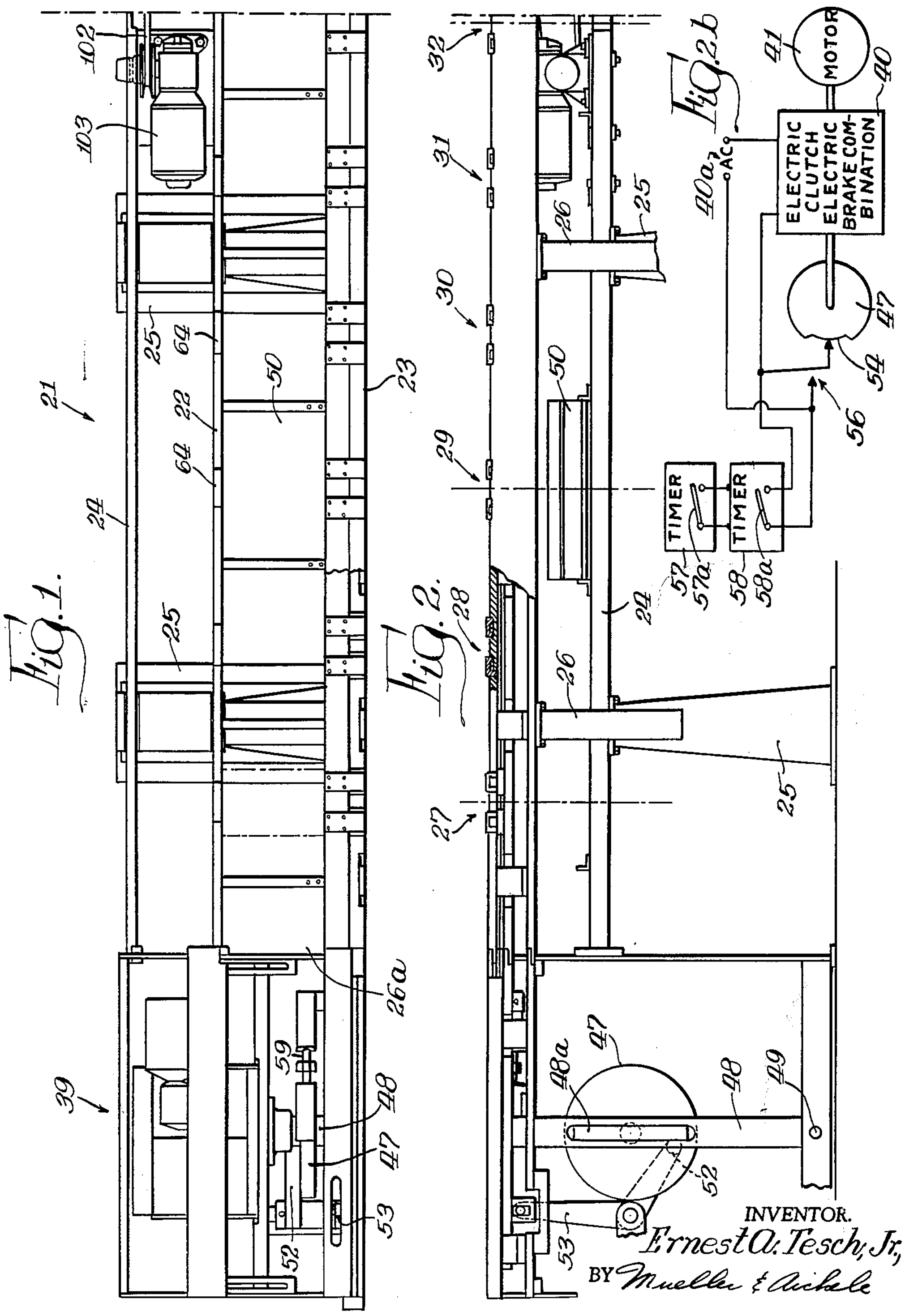

Turning now particularly to the drawings, FIGS. 1 and 2 illustrate the end of the apparatus from which assembly begins. The function of this part of the device is to convey panels to component insertion stations and to move the partly completed chassis to the soldering section. The component insertion section generally indicated at 21 is made up of a pair of parallel tracks or rail members 22 and 23 carried on support members 25 and 26. Horizontal member 24 acts as tie member for supports 25 and 26. Printed circuit panels made up of a flat insulating base with electrically conductive patterns formed on one or both sides thereof are inserted between the tracks 22 and 23 adjacent the intake end of the insertion section generally indicated at **26*a*. As is better shown in FIG. 5, the rails 22 and 23 have longitudinal grooves 22*a* and 23*a*** respectively into which the edges of the panels are adapted to fit.

In the component insertion section 21, panels are moved successively to component insertion stations indicated generally on FIG. 2 at 27, 28, 29, 30, 31 and 32. At these stations various electronic components are inserted into holes formed in the circuit panels. Since this insertion takes a discrete length of time, and since it is preferably accomplished by means of automatic insertion heads, the movement of the panels through the insertion section is intermittent in character, that is, panels are moved from one station to another and allowed to dwell at each station for a predetermined length of time.

Figures 5, 6, 7, 8:
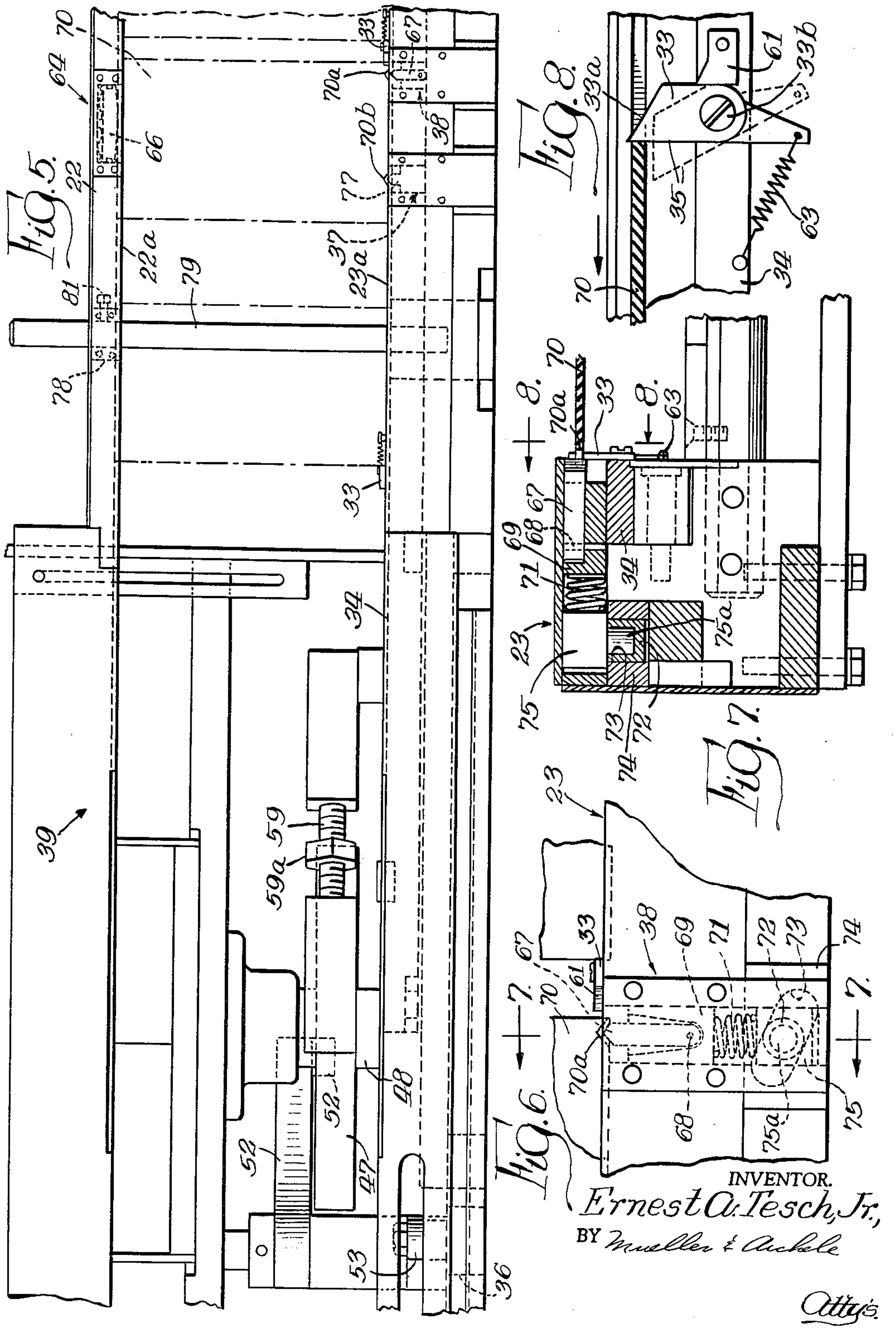
FIG. 5 is a plan view of the drive section of the apparatus and a portion of the assembly component insertion section thereof showing one insertion station.
FIG. 6 is a plan view showing details of one of the two types of locators positioned at the insertion stations.
FIG. 7 is a view taken on the line 7—7 of FIG. 6.
FIG. 8 is a view in section taken on the line 8—8 of FIG. 7.

This type of movement is accomplished by means of a series of vertically extending fingers 33 one of which is particularly illustrated in FIG. 8. Each finger 33 is pivotally connected to reciprocally movable transfer bar 34 which is mounted within the track 23 (see FIG. 7). Also mounted longitudinally and slidably within the track 23 is the locator actuating bar 36 which is used to control the retraction of locators such as 37 and 38 as will be explained subsequently.

Figures 3, 4:
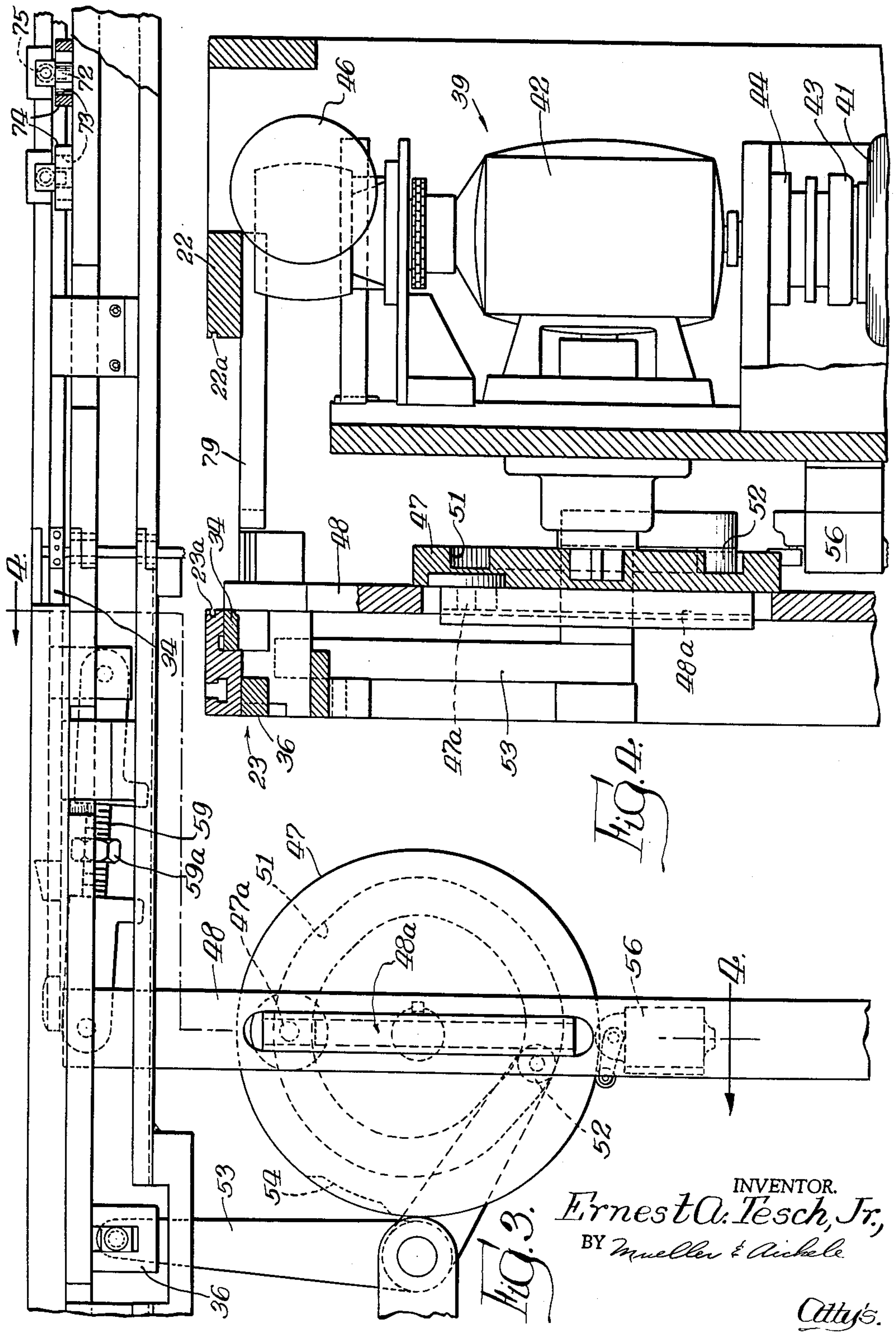
FIG. 3 is a view in side elevation showing the drive section of the apparatus.
FIG. 4 is a view taken in section on the line 4—4 of FIG. 3.

Motion for the transfer bar 34 and the locator actuating bar 36 is provided by means of the drive section generally indicated at 39 (see FIGS. 3 and 4). This includes a main motor 41 coupled to a speed reducer 42 through an electric clutch 43 and an electric brake 44. Drive section also includes a jog motor 46 which is a slower speed motor than the main motor 41 and is adapted to be connected when slow speed operation of the transfer bar 34 is desired for setting up the machine for a particular run. The speed reducer 42 is coupled to the wheel 47 provided with a crank pin **47*a* which engages slot 48*a* on the face of the vertical bar 48. Rotation of wheel 47 thus causes oscillation of bar 48 about the pivot 49** (see FIG. 2).

The wheel 47 also carries a cam track 51 in the face opposite crank pin **47*a*. The cam follower 52 which is connected to the crank 53 rides in cam track 51. The crank 53 is in turn connected to and reciprocates the locator actuator bar 36**.

The outer periphery of the wheel 47 bears against limit switch 56 and holds it closed until the notch 54 comes into registry therewith and allows the switch to open.

FIG. 2*b* is a schematic diagram showing the arrangement of electrical timers used to control rotation of the wheel 47. Engagement and disengagement of the main motor 41 is controlled by an electric clutch-electric brake combination 40 connected to power source **40*a*. The circuit also includes timers 57 and 58. The limit switch 56 is connected in parallel with the timer 58. The purpose of the timing arrangement is to accurately control the time between successive rotations of wheel 47** and thus control the dwell time of the panels at the insertion stations.

The timer 57 is a clock timer adapted to close switch 57a and deliver a voltage pulse of instantaneous duration at the end of each operating cycle. The length of the cycle is adjustable so that the period between pulses may be varied between 0 seconds and 60 seconds, for example. Timer 58 connected in series with timer 57 is also a clock timer which requires a relatively short time, such as 0.5 second, to complete its cycle of operation and which will cycle only once for each application of a voltage pulse to it. The timers are connected as shown in FIG. 2*b* to an electric brake-electric clutch combination which is indicated schematically at 40 and which is adapted to engage and disengage the motor 41 to and from the wheel 47 preferably through a suitable speed reducer. Limit switch 56 and timer switch 58a connect the clutch-brake combination to A.C. source 40a when either of them are closed.

Each cycle of movement of panels to successive insertion stations for dwell at those stations begins at the end of the timing cycle of timer 57 when the switch 57a closes and applies a voltage pulse to timer 58 causing the latter to start its cycle which it does by closing switch 58a and energizing brake-clutch combination 40 thus connecting motor 41 to rotate wheel 47. At the start of each movement cycle, notch 54 of wheel 47 is aligned with limit switch 56 so that the switch is open. The timer 58 remains in the closed portion of its cycle only for a brief period necessary to move notch 54 out of alignment with limit switch 56 thus closing the switch. Since the speed of rotation of wheel 47 is such that it makes a complete revolution in about two seconds, the "on" period of timer 58 need be only very brief to close switch 56 since notch 54 includes only a small angle. Timer 58 then completes its cycle on the "off" position and stops. With limit switch 56 closed wheel 47 completes one revolution until the notch 54 again opens the switch which causes the brake-clutch combination to disengage the motor 41 and stop rotation. This arrangement provides positive action stopping wheel 47 in precisely the same position after each revolution which position is unaffected by any slight variations that might occur in the operating cycle of timer 58.

Timer 58 will not start again until a separate pulse is delivered through timer 57. Timer 57 then completes its cycle in the "off" position, delivers another pulse and the cycle of movement is repeated. The panels dwell at the insertion stations between revolutions of wheel 47 and this period can be selected by controlling the cycle length of timer 57.

Rotation of wheel 47 causes the oscillating bar 48 to pivot about the pivot point 49, thus reciprocating the transfer bar 34 to which oscillating bar 48 is connected by the linkage 59. By means of turnbuckle 59a the end of the transfer bar 34 can be adjusted to permit positioning of fingers 33 at various points along insertion section 21 for handling panels of different lengths. Sliding movement of the transfer bar 34 in the forward direction, that is, away from the drive section 39, carries the fingers 33 against the edges of panels held between the tracks 22 and 23 and pushes them forward from one insertion station to the next, for example, from insertion station 27 to insertion station 28. As shown in FIG. 8, the finger 33 is pivotally mounted and is maintained at its upright position when moving forward by means of stop 61. This causes straight edge 35 of the finger 33 to be urged against the edge of a panel, such as panel 70 shown in FIG. 8.

On the return stroke of the oscillating bar 48 which pulls transfer bar 34 back toward the drive section 39, the finger 33 engages the edges of the panel in the preceeding insertion station along its slanted edge 33a. The finger then pivots about point 33b and slides beneath the edge of the panel (to the position shown in dotted lines on FIG. 8) and is restored to its upright position by the action of the spring 63 after it has cleared the panel.

In motion from one insertion station to the other, it is desired that the panels be located very accurately at the stations, so that they will be properly aligned with automatic insertion heads which insert components such as tubes, resistors and the like into holes formed in the panels. Accurate positioning is facilitated by the locators 37 and 38 at each station in conjunction with the spring padded locators 64, one of which is also located at each insertion station in track 22 directly opopsite the space between the locators positioned in track 23.

The locators 64 each include a plate 66 which is spring mounted and adapted to resiliently bear against the edges of panels held in the horizontally extending groove 22a of the track 22.

Each insertion station has a solid locator 37 and a flexible locator 38. Flexible locator 38 is illustrated in detail in FIGS. 6 and 7. It includes a finger 67 pivotally mounted at point 68 and connected to a block 69 which is urged toward the inner edge of track 23 by the action of spring 71. Spring 71 is actuated by transverse movement of the block 75. Block 75 carries a vertically extending stud 75a which fits within roller 72. Roller 72 moves within the tilted camming slot 73 of block 74 which is carried on the locator actuating bar 36. FIGS. 6 and 7 show the finger 67 in a partly extended position entering the notch 70a of the panel 70 with locator actuator bar 36 in its partially advanced position. As bar 36 moves back in the direction of drive section 39, block 74 moves with it thus retracting finger 67 and permitting movement of panel 70 between tracks 22 and 23. The locator 37 is also moved simultaneously in the same way because it is connected to the locator actuating bar 36 in the same manner as is locator 38. The only difference between locator 37 and locator 38 is that solid locator 37 does not have its finger portion 77 pivotally mounted. In its extended position finger 77 of locator 37 engages a notch 70b formed in the edge of a panel 70 and the action of these fingers in conjunction with the spring loaded plate 66 of locator 64 in the opposite track 22 locates the panel accurately. The purpose of having pin 67 pivotally mounted is so that it can register in a notch that might be slightly misaligned because of expansion or contraction of one of the panels. It is desirable that a solid locator, such as 37 and a flexible locator such as 38 be present at each of the insertion stations. The locators can be interchanged in their position so that the flexible locator may be adjacent the trailing edge of the panel rather than the leading edge as shown in FIG. 5. Relative locations of the flexible or solid locators will depend upon whether insertion is to be made in the forward or trailing half section of the panel at a particular station with the solid locator being positioned toward the half which is to be more accurately located for insertion.

Reciprocal motion of the locator actuating bar 36 is synchronized with that of transfer bar 34 so that the locators are retracted at the start of a forward stroke of transfer bar 34 before fingers 33 engage the edges of the forward panels. The insertion stations are so arranged that there is a short distance (about ⅜ of an inch) for each finger to move in the forward direction before it engages the edge of the forwardly-located panel in order to allow for retraction of the locators 37 and 38 at each insertion station.

As indicated in FIG. 5, the track 22 is connected at a number of positions to blocks such as 78 which are held to transverse rods such as 79 by set screws such as 81. The block 78 and hence the track 22 may thus be moved toward or away from the opposite track 23 to accommodate panels of differening widths for different production runs.

In certain applications, it is desirable to illuminate the panels at the various insertion stations. For this purpose, light banks such as 50 (see FIG. 2) may be mounted on the support 24 below the desired stations. Light reflecting screens may be interposed between the light banks and the panels illuminated if desired.

Figures 1A, 2A:
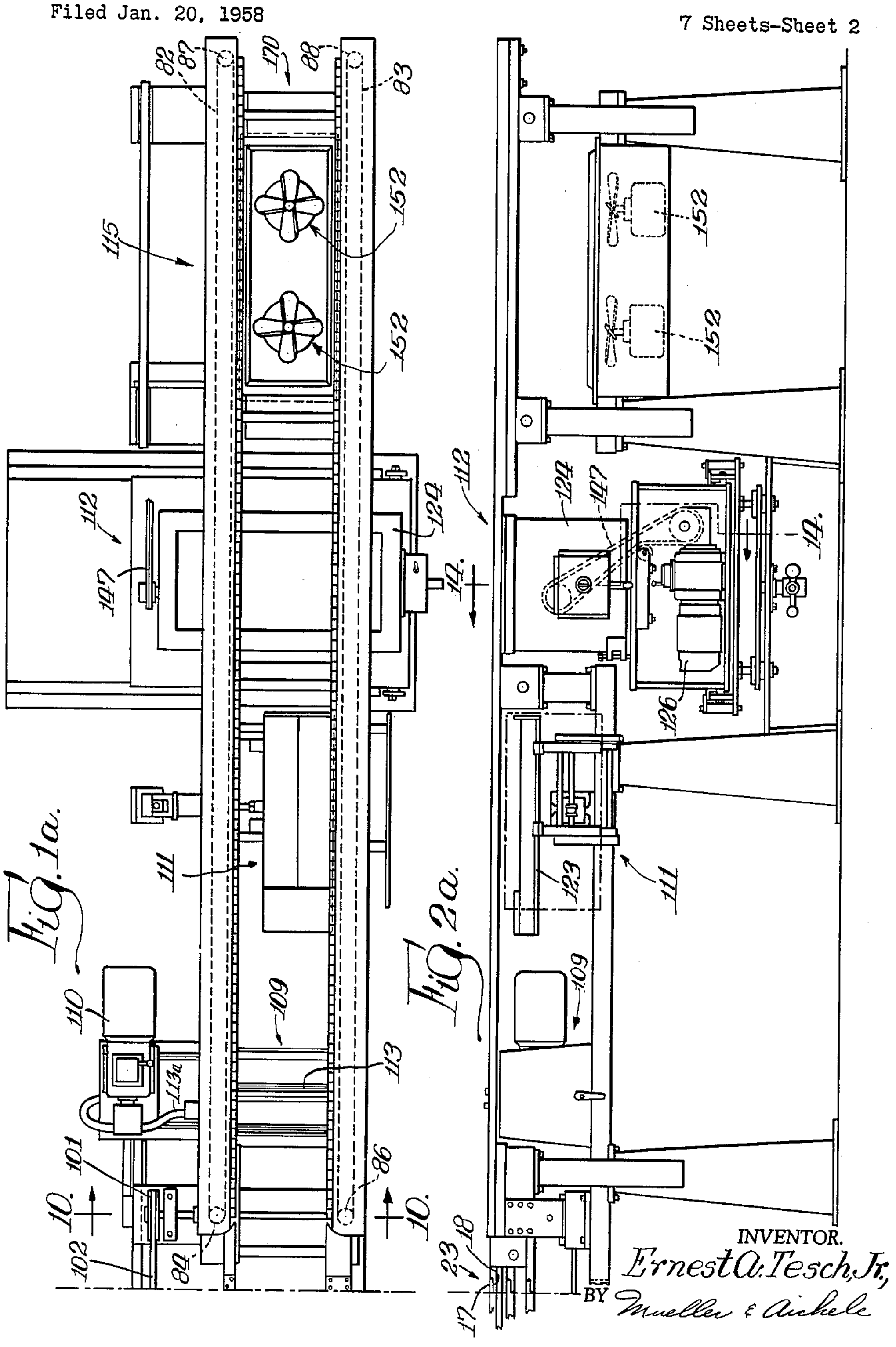

The ends of the tracks 22 and 23 are formed with tongue portions such as 17 and 18 indicated in FIG. 2*a* which fit together and may be secured by suitable bolts. Both rails are conveniently built in sections having such overlapping tongues so that the length of the insertion section 21 can be varied conveniently by adding or removing insertion stations as required for the production of different types of chassis.

Figures 9, 10:
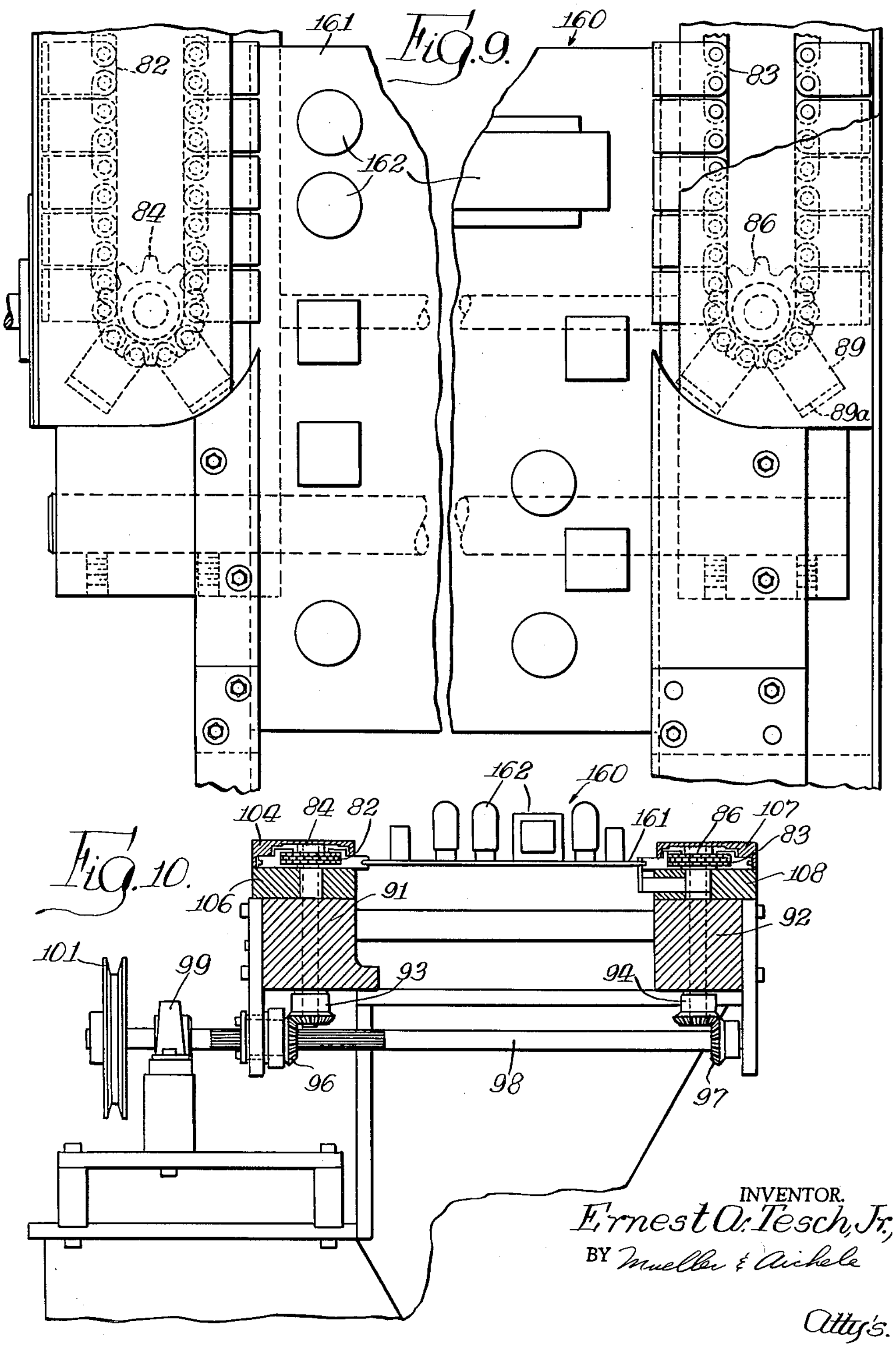
FIG. 9 is a plan view showing a printed circuit chassis assembly passing from the insertion section to the soldering section of the apparatus.
FIG. 10 is a view in section taken on the line 10—10 in FIG. 1*a*.

After suitable electronic components have been inserted in the flat panels in the insertion stations, the panels pass to the soldering section of the apparatus so that the components may be fixed to the panels. As particularly illustrated in FIGS. 1*a*–2*a*, the soldering section of the apparatus includes a conveyor system made up of a pair of endless chains 82 and 83 which are looped about supporting sprockets 84, 86, 87 and 88. As best shown in FIG. 9, each chain 82 and 83 carries a series of flat links 89 extending perpendicular to the direction of travel of the chains, each link having a groove **89*a* in its face remote from the chain. These grooves are in the same horizontal plane as the panels in the insertion section and are aligned to receive the edges of the panels. As shown in FIG. 10, the sprockets 84 and 86 are mounted at the ends of vertical shafts 91 and 92, respectively, which are rotated through bevel gears 93 and 94, which mesh with bevel gears 96 and 97 positioned at the ends of horizontal spline 98. The spline is journaled in the bearing 99 having mounted at its end the wheel 101 which is turned by a belt 102 from the motor 103** (FIG. 1).

Each chain 82 and 83 moves longitudinally within a pair of longitudinally extending plates 104 and 106, 107 and 108, respectively. The bevel gear 96 is mounted so that it can be slid along the spline 98 toward or away from the gear 97 carrying sprocket 84 and the chain 82 with it so that the distance between the chains 82 and 83 can be adjusted to accommodate panels of different widths. Sprocket 87 is also mounted for corresponding adjustment.

The panel conveyor system passes over a fluxing station indicated at 109, a pre-heating station indicated at 111, a soldering station indicated at 112 and a cooling station indicated at 115. The relative positions of these stations in the apparatus are shown in FIGS. 1*a* and 2*a*.

Figures 11, 12, 13:
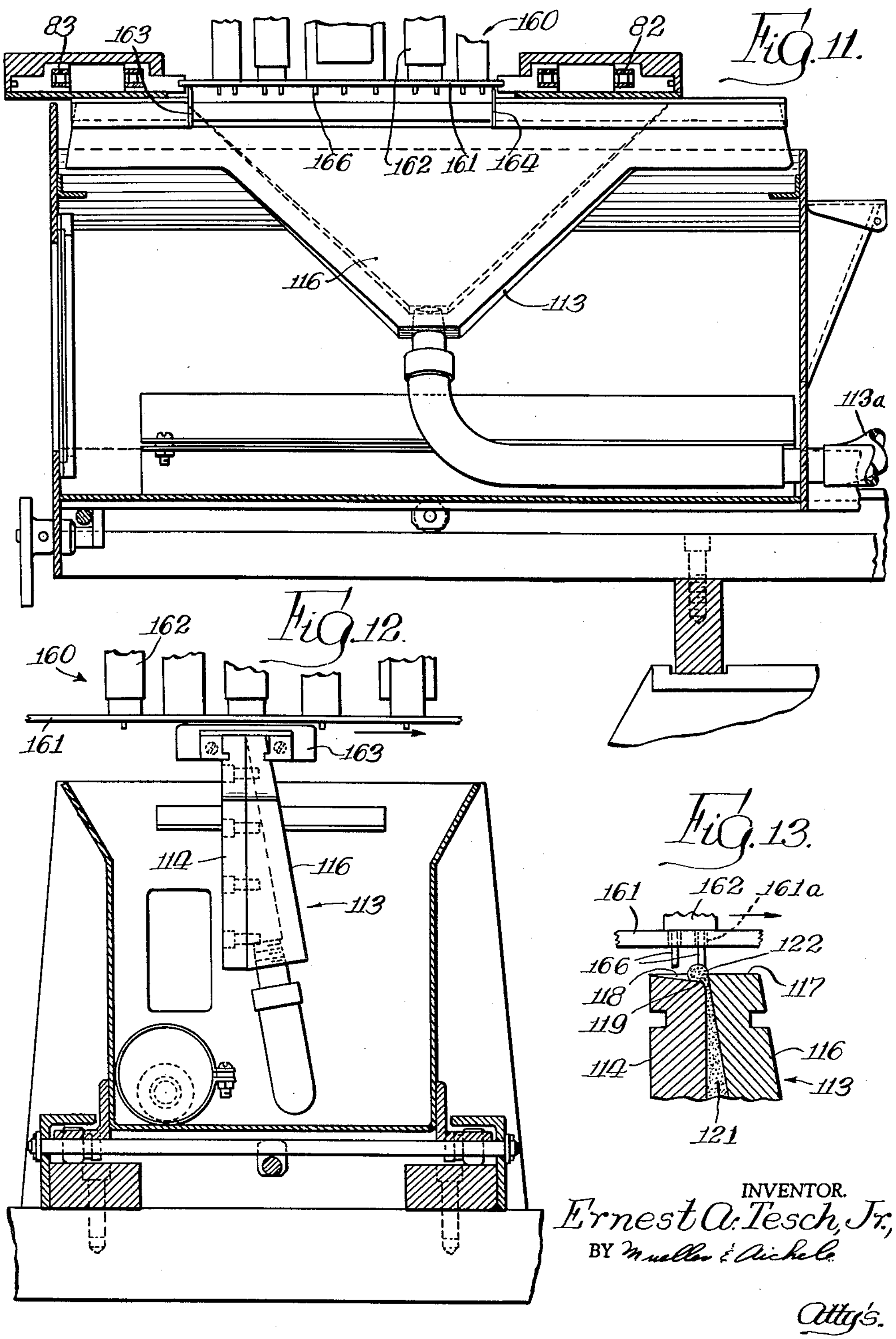
FIG. 11 is a view in elevation showing a panel assembly passing across the fluxing nozzle.
FIG. 12 is a view in side elevation at the fluxing station.
FIG. 13 is a detail view showing the application of flux to protruding leads of a component inserted in holes of a circuit panel.

The fluxing station 109 includes a flux pump 110 which introduces liquid flux through the line **113*a* into the fluxing nozzle 113, illustrated in FIGS. 11–13. The nozzle 113 is made up of a pair of angularly disposed plates 114 and 116 which extend transversely beneath the conveyor system and terminate slightly below the level across which panels are passed. As shown in FIG. 13, the upper face 117 of the plate 116 is essentially horizontal, whereas the upper face 118 of the plate 114 declines at a slight angle below the horizontal so that the upper face 118 has an edge 119, slightly below the upper face 117. Flux indicated at 121 is expressed through the opening between plates 114 and 116 in the form of a roll 122 which extends slightly above the upper face 117**. The flux typically employed is a liquid rosin flux that has been diluted with a spirit thinner to reduce its viscosity to substantially that of water.

The heating section 111 (FIG. 2*a*) is made up of radiant heating element 123, spaced below the level of panel travel.

Figures 14, 15, 16:
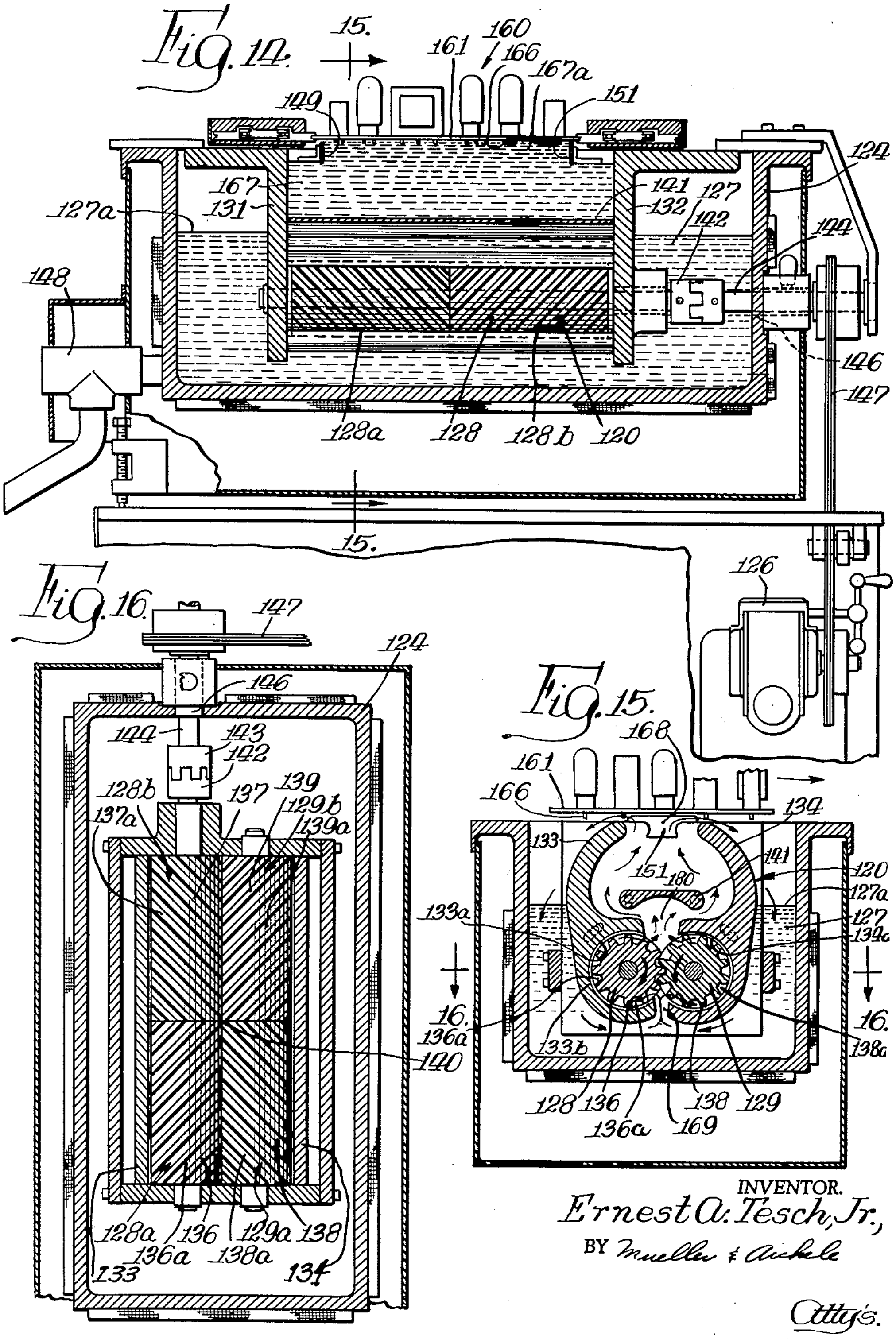
FIG. 14 is a view taken on the line 14—14 of FIG. 2*a*.
FIG. 15 is a view taken in section on the line 15—15 of FIG. 14.
FIG. 16 is a view in section taken on the line 16—16 of FIG. 15.

The soldering section 112 is made up of a substantially rectangular open-top container or crucible 124 which contains a quantity of molten solder and the motor 126 for driving the solder hump forming means positioned within the container. As shown in FIGS. 14–16, the container 124 encloses a body of molten solder 127 and a positive displacement gear pump 120 for raising a hump of molten, scum-free solder across which the chassis assemblies are moved.

The solder pump 120 includes two cylindrical intermeshing gears 128 and 129, each rotatable about a horizontal axis and extending partially across the container 124. The gears are positioned between two vertically extending brackets 131 and 132, and are partially enclosed by housing members 133 and 134. The housing members form semi-cylindrical enclosures **133*a* and 134*a* within which the gears 128 and 129** rotate respectively with the enclosure extending around a part of the circumference of each gear as shown in FIG. 15.

Each of the gears 128 and 129 is divided into two axially extending half portions **128*a* and 128*b* and 129*a* and 129*b*, respectively. As shown particularly in FIG. 16, each half portion of each gear has its surface cut to form a series of helically formed gear spurs or teeth 136, 137, 138 and 139. The configuration of each of the half portions is such that the helix advances away from the centerline 140 as the gears 128 and 129** are rotated in the direction shown in FIG. 15.

A baffle member 141 is positioned between the brackets 131 and 132 and is spaced vertically above the meshing gears 128 and 129.

Gear 128 (FIG. 16) carries at one end a jaw 142 which engages jaw 143 carried on shaft 144. Shaft 144 extends through a wall of container 124 and is surrounded by the bushing 146. Shaft 144 is rotated by means of the chain 147 connected to the variable speed motor 126 (FIG. 14). This in turn causes rotation of cylindrical gear 128 which meshes with and drives gear 129.

The container 124 is also provided with suitable drain means 148 for removing molten solder therefrom. This drain means is provided with suitable heating means (not shown) for preventing the solder from solidifying and thus blocking drainage.

A pair of adjustable guide plates 149 and 151 are positioned at the tops of the housing members 133 and 134 and are adapted to be moved transversely across the housings in a direction parallel to the axes of rotation of the gears 128 and 129. These are illustrated particularly in FIGS. 14 and 15, but are shown somewhat diagrammatically, and their proper size and operation will be more fully explained herein. For instance, the guide plates are of such a size that each will close the opening between the inside of the corresponding wall 131 or 132 rather than be open as in FIG. 14. Furthermore the downwardly extending tongue in FIG. 15 will be dimensioned so as to close the opening between the housing members 133 and 134. In this manner the guide plates and the housing members provide an opening through which the solder is projected in a controlled area commensurate with the amount of heat and solder application which the workpiece can accommodate. The speed of movement of the workpiece along the conveyor is also considered.

The cooling station 113 (FIG. 1*a*) includes the fans such as 152 mounted below the conveyor system which circulates cooling air over the chassis assemblies after they have passed over the soldering section.

In operation of the apparatus a chassis assembly such as 160 consisting of a printed circuit panel 161 having electronic components 162 inserted in it by the insertion of leads from such components into holes formed in the panel 161 is moved from the final insertion station 32 (see FIG. 2) by the action of one of the fingers 33 and is picked up at its edges in the grooves **89*a* of the moving links 89 as shown in FIG. 9. As previously explained, in the insertion section of the apparatus it is desirable that the panels be moved intermittently from one insertion station to another and be allowed to dwell there for a predetermined length of time. However, in the soldering section continuous motion of the panels is desirable to provide for uniform flux and solder application, and the conveyor system made up by chains 82 and 83 provides such continuous motion. In addition the system permits easy and continuous transfer of assemblies from the insertion section to the soldering section. The panels are held in the same horizontal plane by the links 89 as they were by tracks 22 and 23**.

In order that the components 162 can be satisfactorily soldered to the panel 160, it is desirable that a liquid flux be applied to the component leads 166. In the past, such application of flux has been made by spraying the flux toward the workpieces or by wiping them with a brush or the like dipped in flux. Such procedures tend to be wasteful or are impractical for electronic chassis manufacture since they may disturb the position of the leads to which the flux is applied. The fluxing nozzle 113 provides a roll of liquid flux 122 extending across a width of the nozzle 113 corresponding to the width of the panel assembly 160. As shown in FIG. 11, the upper surface of the nozzle is provided with a pair of slidably adjustable stop members 163 and 164 which limit the width of the flux roll 122. By recessing the corner 119 of the upper face 118 of plate 114 as shown in FIG. 13, the flux nozzle provides for the formation of the upstanding roll 122 which extends above the upper face 117 of the nozzle plate 116. Movement of the panel 161 across the nozzle 113 permits the downwardly extending leads 166 from components 162 to engage the flux roll 122 and to become coated with flux to improve their subsequent reception of molten solder. The flux roll 122 rises about ⅜ of an inch above the nozzle 113 and since the leads 166 normally extend ¼ of an inch below the lower surface of panel 161 the leads may be coated with flux without their striking the nozzle.

The assemblies such as 160 are moved by the chains 82 and 83 and the link members 89 from the fluxing station to the preheating station 111 where the action of the heaters 123 bring the panels to a suitable temperature for the application of solder.

From the heating station 111 the assemblies 160 are moved across the soldering station 112. At this station the undersides of the panels 161 and the downwardly extending component leads 166 are contacted with the top of the hump of the scum-free molten solder formed in the surface of solder body 127 by the rotation of gears 128 and 129. The molten solder contacts the fluxed leads 166 and the metal around the bores on the undersurface of the panel 161 and rises into such bores of the holes 161a in the panel surrounding the fluxed leads to form secure solder joints.

The molten mass of solder 167 shown in FIG. 14 rises between guide plates 149 and 151 to form a confined portion 167a or hump with which workpieces are contacted. The solder tends to rise between the plates because they are made of a material non-alloying or non-wetting to solder such as stainless steel. The width of portion 167a is controlled to correspond to the width of panels 161 by adjusting the distance between guide plates 149 and 151. Panel assemblies 160 are moved across the top of hump portion 167a in a direction at right angles to the axes of rotation of gears 128 and 129 as indicated by the arrow adjacent the panel in FIG. 15 and along a horizontal plane parallel to the plane of such axes. The plane of travel of the panel 161 is vertically spaced from gears 128 and 129 and from the solder body 127 but is such that contact is made between the undersurface of the panel 161 and the top of the solder hump. Since the top of molten mass 167 is essentially flat in portion 167a, contact is made along a plane surface whose length is determined by the dimension of opening 168 between the tops of housing members 133 and 134 in the direction of panel travel and whose width is determined by the spacing between guide plates 149 and 151. This planar contact permits application of solder to the entire undersurface of panel 161 so that no junction points will fail to make contact with solder and enables contact between solder and panel to be maintained for a desired time interval to effect proper soldering. This interval is determined by the rate of panel travel and the dimension of opening 168 in the direction of panel travel. Since either or both of these are adjustable, the solder contact interval can be adjusted for particular material requirements. Control of the solder contact interval is important because heat is transferred to the panels 161 as they contact the molten solder. Since these panels are frequently made of a thin plastic laminate that can be seriously damaged by overheating, the solder contact interval must not be so long that sufficient heat is transferred to the panels to damage them. Rate of panel travel is conveniently maintained constant for specific production requirements and the adjustability of opening 168 by housing members 133 and 134 makes it possible to control solder contact interval for a given rate of panel travel in accordance with the heat resisting properties of the panels being soldered. These properties depend on the nature of the material forming the panels and on panel thickness. For a given material, thinner panels are less heat resistant and require a shorter solder contact interval.

The molten mass of solder indicated at 167 in FIG. 14 which makes up the hump portion is formed of clean, sum-free molten solder drawn from the interior of the solder body 127 by the action of the gears 128 and 129. As gear 128 is rotated in the direction indicated in FIG. 15 by rotation of shaft 144 from variable speed motor 126, it meshes with gear 129 as shown causing the latter to rotate. The spaces 136a between adjacent teeth 136 of gear half 128a are filled with solder as the gear rotates within solder body 127. This is also true for the corresponding spaces 137a, 138a and 139a between the corresponding gear teeth 137, 138 and 139 on gear halves 128b, 129a and 129b respectively. As each space 136a enters the enclosure portion 133a, the solder in the space is confined therein by the wall 133b of housing 133 so that individual quantities of solder are lifted along the direction of rotation of gear 128. Corresponding action takes place in the other gear halves.

As teeth 138 mesh with spaces 136a solder held in these spaces is displaced by the entering teeth and expelled into opening 180. The solder in this opening cannot run back between the gears because of the intimate contact of the opposing gears along their line of meshing. Solder is similarly displaced from spaces 138a by teeth 136. Corresponding displacement action occurs along gear halves 128b and 129b with teeth 137 displacing solder from spaces 139a and teeth 139 displacing solder from spaces 137a. Solder is impelled upwardly through opening 180 toward baffle 141 by displacement of successive quantities of solder from the gear spaces by the continued rotation of gears 128 and 129. Molten solder is thus lifted from the interior of the solder body 127 since the solder level is such that rotating gears 128 and 129 are at least partially submerged in solder.

As shown in FIG. 15 by the directions of the arrows, solder is impelled upwardly within the housing members 133 and 134 and is deflected by the baffle 141. The baffle 141 serves to smooth out the solder flow and thus reduces turbulence at the top of solder hump 167. After the solder flows around the baffle 141, it flows through the opening 168 formed between the tops of the spaced-apart housing members 133 and 134. The solder flows outwardly over the tops of the housing as over a weir and the opening 168 exposes the top of a mass of clean, moving, scum-free solder for contact with the undersides of panels 161 and the downwardly extending leads 166. The height of solder mass including the hump portion 167a formed in the surface of solder body 127 is controlled by the speed of rotation of gears 128 and 129. The height of the hump is adjusted to such a level that solder will have a tendency to rise within the bores of the holes in panel 161 in which leads 166 have been inserted so as to form connections extending entirely through the bores, and also in any bores or metal linings even though there is no wire protruding downwardly in the bore. The top of the hump is substantially non-turbulent due to the fact that it is raised by positive, progressive displacement, and due to the effect of the baffle 141.

Typically the height of the hump 167a is such that it is from 1/16 to 1/23 of an inch above the undersurface of panel 161. Capillary action also tends to cause the solder to rise within the bores of the panel holes.

As illustrated in FIG. 15 the direction of flow of solder in the top of hump portion 167a is countercurrent to the line of panel travel in the trailing half of the exposed portion and concurrent in the leading portion. As the solder flows over the curved upper edge of housing member 134 it gradually drops away from the undersurface of panel 161 moving across and in contact with the hump. This produces a desirable wiping action which removes excess solder from each joint and prevents formation of undesirable solder "tails" such as are formed when a panel is lifted vertically from a solder bath in which it has been dipped.

After flowing over the tops of housing members 133 and 134 the molten solder flows in the directions indicated by the arrows outside of the housing means and is returned to the solder body 127. The solder forming hump 167 is continuously moving and is drawn from the interior of the solder body 127 through opening 169. For this reason there is no problem due to scum formation and effective solder joints are produced. This is because the solder impelled into the hump is taken from the interior of body 127 whereas any scum floats along the surface 127a. Solder flowing from the top of the hump passes through the scum layer to the interior of body 127 and remains scum-free.

The particular configuration of the gear spurs cut on the surface of gears 128 and 129 provides important practical advantages. Since the solder is impelled upwardly by the displacing action of the gear teeth as described, the flow of solder is smooth and uniform across the axial dimension of the gears. This is because the helical configuration of the gear teeth and the spaces between them provide a continuous and progressive displacement action. Because of the herringbone pattern formed by the gear teeth, as particularly shown in FIG. 16, the direction of progressive displacement is outward from the centerline 140 and so successively displaced solder waves are not piled on one another to produce a solder hump having a contour non-uniform along the axes of rotation of the gears. The gear configuration shown produces a solder hump whose top is relatively uniform along the axes of the gears thus permitting uniform application of solder across the panels or similar workpieces. Because of the continuous nature of the displacement action, the top level of the hump is free from pulsation and remains constant for a given speed of gear rotation.

The positive displacement action of the gears 128 and 129 permits the height to which the solder hump 167 rises to be controlled by the speed of rotation of the gears and to be effectively independent of the quantity of molten solder within the container. As long as there is a sufficient quantity of solder in the container to be engaged by the rotating gears 128 and 129, the solder hump 167 will be maintained at a constant height as long as the speed of rotation of the gears remains constant. This is of substantial practical advantage since the quantity of solder in the container is constantly depleted by its being deposited on the successive circuit panels passed over it. If the hump 167 were formed by centrifugal action as where a paddle wheel type impeller is used to raise it, the speed of rotation of the centrifugal type impeller would determine the height of which the hump rises above the normal solder level. With constant depletion of the quantity of solder the level of the top of the hump would thus constantly fall requiring frequent replenishing of the solder in the container. This is not necessary using the positive displacement type means illustrated.

In the past, there has been a substantial problem of leakage around rotating shafts surrounded by molten solder. This is avoided in accordance with the present invention by making the rotating shaft 144 the surrounding bushing 146 and the wall of container 124 of a metal which is non-alloying to solder, that is, not wet by it. Suitable materials include cast iron and stainless steel. Container 124 and bushing 146 are of cast iron and the shaft is of stainless steel. By using these materials and by filling the space between the shaft 144 and the bushing 146 with a high temperature silicone grease; leakage of solder around the shaft is effectively avoided. The shaft 144 can then enter the container 124 below the solder level thus simplifying the design of the drive means for the gear pump.

As shown in FIG. 15, the housing members 133 and 134 are pivotally mounted on the brackets 131 and 132 so that the width of the opening 168 between their tops can be controlled. This corresponds to the dimension of the exposed solder hump along the direction of travel of the panels. Usually this dimension is made somewhat less than the longitudinal dimension of the panel. For example, in applying solder to panels 9 inches long the housing members 133 and 134 would be so adjusted that the space 168 between them would be about 6 inches. The dimension of the width of the exposed solder hump along the line of travel of the panels is adjusted by means of the plates 149 and 151 so that in conjunction with the housing members these plates can be used to control the exposed solder area.

After application of solder to the undersides of the circuit panels the assemblies 160 are moved by the conveyor system across the cooling station 113 where air is blown against them by fans 152. The completed assemblies are then discharged at the exit end 170 of the assembly apparatus.

The apparatus of the present invention thus provides equipment for moving circuit panels to and accurately positioning them at component insertion stations and conveying the partly completed chassis assemblies to a soldering section wherein components are soldered within the bores of holes in the panel. A solder pump of novel configuration raises a clean, scum-free solder hump of controlled contour and dimensions across whose top the assemblies are moved with the undersides of the base panels making planar contact with the hump along the length and width of the panels. The height of the solder hump is controlled so that solder will rise within the bores of holes in the circuit panels. Adjustable housing means of the pump expose a solder area of predetermined dimension in the direction of panel travel so that the interval of contact between panels and solder can be controlled. Because the solder pump operates by lifting clean solder from the interior of a solder body by intermeshing, helically formed gear teeth a smooth and uniform upward solder flow is produced. Since the hump is formed by positive displacement action its height is controllable by the speed of rotation of the pump gears and is effectively independent of the total quantity of solder available. This enables the solder hump level to be maintained constant during operation without continuous replenishing of the solder supply to compensate for depletion. The provision of the controlled solder hump permits linear movement of the panel assemblies along the device while effecting solder application effectively, quickly, uniformly and economically.

I claim:

1. Soldering apparatus including in combination, a container for molten solder, a body of molten solder in said container, a positive displacement gear pump including a pair of intermeshing, cylindrical gears within said container and wholly submerged below the solder, each gear rotatable about a horizontal axis and each having helical solder-lifting teeth in contact with the molten solder body, means for rotating said gears to provide an upward flow of solder, means for confining the upwardly flowing solder to form a scumfree solder hump of a predetermined width and a predetermined height above the solder in said container which is not a part of the hump with its upper surface extending substantially parallel to the axis of rotation of said gears and spaced from said gears, horizontal baffle means positioned between said gears and the upper surface of the hump for deflecting the flow of upwardly impelled solder to provide an evenly distributed and smooth flow of solder in said hump, and conveyor means extending across said container for contacting workpieces with the solder hump.

2. Soldering apparatus including in combination, a container for molten solder, a body of molten solder in said container, a positive displacement gear pump including a pair of intermeshing cylindrical gears wholly submerged below the solder within said container, each gear rotatable about a horizontal axis and each having two axially extending half portions, each of said half portions having helically shaped solder-lifting teeth formed in the curved surface thereof and in contact with the solder body with the helices formed by the teeth in each of said half portions advancing outwardly in opposite directions axially of said cylindrical gear, means for rotating said gears to form a scum-free solder hump extending above said gears with its upper surface extending substantially parallel to the axes of rotation of said gears and spaced from said gears, horizontal baffle means positioned between said gears and the upper surface of the hump for deflecting the flow of upwardly impelled solder, means for confining the upwardly impelled solder to a predetermined width and conveyor means extending across said container for contacting workpieces with the solder hump.

3. Soldering apparatus including in combination, a container for molten solder, a body of molten solder in said container, a positive displacement gear pump including a pair of intermeshing cylindrical gears wholly submerged below the solder within said container, each gear rotatable about a horizontal axis and each having two axially extending half portions, each of said half portions having helically shaped solder-lifting teeth formed in the curved surface thereof and in contact with the solder body with the helices formed by said teeth in each of said half portions advancing outwardly in opposite directions axially of said cylindrical gear, means for rotating said gears to form a scum-free solder hump extending above said gears with its upper surface extending essentially parallel to their axes of rotation and spaced from said gears, housing means within said container confining said gears and the solder hump, means forming an opening along the bottom of said housing means permitting the flow of solder from outside of said housing means upwardly toward the rotary gears and means forming an opening along the top of the housing means for exposing the top of the solder hump, horizontal baffle means within said housing means positioned between said gears and the upper surface of the hump for deflecting the flow of upwardly impelled solder to provide an even and smooth flow of solder in said hump, and conveyor means extending across said container for contacting workpieces with the solder hump.

4. Soldering apparatus including in combination, a container for molten solder, a body of molten solder in said container, a positive displacement gear pump including a pair of intermeshing cylindrical gears within said container, each gear rotatable about a horizontal axis and each having two axially extending half portions, each of said half portions having helically shaped solder-lifting teeth formed in the curved surface thereof and in contact with the solder body with the helices formed by the teeth in each of said half portions advancing outwardly in opposite directions axially of said cylindrical gear, means for rotating said gears to form a scum-free solder hump covering said gears and extending with its upper surface essentially parallel to their axis of rotation and spaced from said gears, a pair of housing members between which said gears extend, said housing members effective to confine the solder hump and being spaced apart at their tops to expose the top of the solder hump and spaced apart at their bottoms to permit flow of solder from outside the housing means toward said gears, a pair of guide plates spaced apart in a direction parallel to the axes of rotation of said gears extending into the solder hump and cooperating with said housing members to expose the top of the solder hump as a rectangle of controlled dimensions, horizontal baffle means positioned between said gears and the upper surface of the hump for providing a smooth evenly distributed flow of molten solder in said solder hump, and conveyor means extending across said container for contacting workpieces with the exposed top of the solder hump.

5. Apparatus for applying molten solder to substantially the entire underportion of a printed circuit assembly on a panel of insulating material, said apparatus including in combination, a container for housing molten solder, a body of molten solder in said container, rotary pump means submerged in the molten solder and adapted to impel fresh molten solder from the interior of the solder body upwardly into a scum-free flowing hump of molten solder which extends to a predetermined height above the solder that is not a part of the hump, means for confining the flow of molten solder to limit the hump to a predetermined configuration and to a width corresponding to the width of the printed circuit assembly to be soldered, baffling means positioned between said pump means and said confining means effective to distribute the flow of solder evenly with respect to said confining means for rendering the contour of the hump comparatively uniform and for reducing turbulence in the hump, supporting means extending over said container and past said hump for carrying a series of the printed circuit panel assemblies, and means for moving the printed circuit assemblies along said support means so that only the underportions of the assemblies are engaged in touching contact by the hump of molten solder, with the hump formation being of such configuration that molten solder is applied uniformly over the area of each assembly as it traverses the hump.

6. Apparatus for applying molten solder to solderable portions of a printed circuit assembly on a panel of insulating material, said apparatus including in combination, a container housing a quantity of molten solder, rotary means wholly submerged below the normal level of the solder in said container, a driving mechanism for rotating said rotary means at a predetermined speed which causes molten solder to flow from said rotary means into a hump formation extending above the normal solder level in said container, confining means including horizontally extending members forming a generally rectangular opening above the normal level of solder in the container and located in position to receive the flowing solder between the same so that the configuration of the hump is established by said confining means, a pair of said horizontally extending elements being spaced apart horizontally a predetermined distance corresponding to the width of the insulating panel for confining the hump of solder to such width, baffle means including a deflecting element positioned in the flow path of the solder between said confining means and said rotary means for deflecting and controlling the flow of molten solder and effective to distribute the flow of solder evenly within the opening formed by said members so that said solder hump is smooth and of comparatively uniform configuration, and means for moving a series of the printed circuit assemblies over said container in a direction and position relative to said container to traverse said hump, with the underportion of each such assembly being contacted substantially uniformly across its entire width by the solder hump.

7. Soldering apparatus including in combination, a container for molten solder, said container having a wall of metal non-alloying with molten solder, a body of molten solder in said container, a positive displacement gear pump including a pair of intermeshing, cylindrical gears within said container and wholly submerged below the solder, each gear rotatable about a horizontal axis and each having helical solder-lifting teeth in contact with the molten solder body, rotatable means within said container wholly submerged in said body of solder for rotating said gears to provide an upward flow of solder, means for confining the upwardly flowing solder to form a scum-free solder hump of a predetermined width and a predetermined height above the solder in said container, a rotatable shaft of metal non-alloying with molten solder extending through said wall of said container at a position below the level of solder held in said container, said shaft adapted to rotate said rotatable means, a bushing of metal non-alloying with molten solder surrounding said shaft and within which said shaft is adapted to rotate, said shaft being lubricated within said bushing by a silicone grease, means exterior said container for rotating said shaft, horizontal baffle means positioned between said gears and the upper surface of the hump for deflecting the flow of upwardly impelled solder to provide an evenly distributed and smooth flow of solder in said hump, and conveyor means extending across said container for contacting workpieces with the solder hump.

8. A positive displacement gear pump for forming a circulating mass of molten solder having an exposed top portion of a predetermined size, said pump including in combination, a pair of intermeshing cylindrical gears wholly submerged below the solder within said container, each gear rotatable about a horizontal axis and each having two axially extending half portions, each of said half portions having helically shaped solder-lifting teeth formed in the curved surface thereof and in contact with the solder body with the helices formed by said teeth in each of said half portions advancing outwardly in opposite directions axially of said cylindrical gear, and a pair of housing members extending axially and vertically of said gears, said housing members being effective to confine the solder mass propelled vertically by said gears and being spaced apart at their tops in a direction perpendicular to the axis of rotation of said gears to expose the top of the solder mass, said housing members being mounted adjustably with respect to one another so that the spacing between them and the area of exposed solder can be predetermined.

9. Apparatus for soldering components to flat panels wherein leads or components carried on said panel extend below the bottom surface thereof, said apparatus including in combination; a fluxing station comprising a fluxing nozzle having a first vertically extending plate with a substantially horizontal upper face and a second vertically extending plate spaced horizontally from said first plate to provide an aperture for liquid flux, said second plate having a slanting top face sloping downwardly towards said first plate, with said nozzle operable to express liquid flux as a vertically extending roll as said liquid flux is applied to said nozzle under pressure by a flux pump; a soldering station comprising an open top container, a body of molten solder in said container, a positive displacement gear pump having a pair of intermeshing cylindrical gears wholly submerged within the solder in said container, each gear having a helically grooved curved surface and being rotatable about a horizontal axis, each gear further having helical solder lifting teeth thereon in contact with the solder body, and means for rotating said gears to form a scum-free solder hump of flowing molten solder extending above said gears with its upper surface essentially parallel to the axis of rotation of said gears; and a conveyor system extending across said fluxing station and said soldering station and positioned to move said panels along a horizontal plane continuously over said station at a predetermined rate such that the leads of the components extending below the bottom of the panels engage said flux roll without engaging said fluxing nozzle, and the bottom surfaces of said panels are contacted with the top of the solder hump.

References Cited in the file of this patent

UNITED STATES PATENTS

| | | |
|---|---|---|
| 316,896 | Hubel et al. | Apr. 28, 1885 |
| 522,778 | Brown | July 10, 1894 |
| 814,779 | Graham | Mar. 13, 1906 |
| 996,374 | Swan | June 27, 1911 |
| 1,702,808 | Brenzinger | Feb. 19, 1929 |
| 1,736,935 | Navarre | Nov. 26, 1929 |
| 1,951,125 | Brooks | Mar. 13, 1934 |
| 2,135,995 | Witzke | Nov. 8, 1938 |
| 2,382,042 | Etnyre | Aug. 14, 1945 |
| 2,387,736 | Bierman | Oct. 30, 1945 |
| 2,469,392 | Jones et al. | May 10, 1946 |
| 2,515,097 | Schryber | July 11, 1950 |
| 2,529,699 | Lach | Nov. 14, 1950 |
| 2,667,138 | Maher | Jan. 26, 1954 |
| 2,668,614 | Lawson | Feb. 9, 1954 |
| 2,671,264 | Pessell | Mar. 9, 1954 |
| 2,683,099 | Hahn | July 6, 1954 |
| 2,747,695 | Bourcier De Carbon | May 29, 1956 |
| 2,770,875 | Zimmerman | Nov. 20, 1956 |
| 2,869,497 | Lehner | Jan. 20, 1959 |
| 2,895,683 | Dvorak | July 21, 1959 |

FOREIGN PATENTS

| | | |
|---|---|---|
| 712,109 | Great Britain | July 21, 1954 |

OTHER REFERENCES

Electrical Manufacturing (February 1957). (Pages 129 relied on.)

Dow Corning Silicone Products, 1955 Reference Guide (April 29, 1955, copyright 1959), page 3, Midland, Michigan.